United States Patent [19]

Ito et al.

[11] Patent Number: 5,158,390
[45] Date of Patent: Oct. 27, 1992

[54] JOINTING STRUCTURE OF ROTOR AND SHAFT

[75] Inventors: Masahiro Ito; Mitsuya Ono, both of Kohnan; Nobuya Amano, Kobe, all of Japan

[73] Assignee: Diesel Kiki Co., Ltd., Tokyo, Japan

[21] Appl. No.: 668,683

[22] Filed: Mar. 7, 1991

Related U.S. Application Data

[63] Continuation of Ser. No. 373,204, Jun. 30, 1989, abandoned, which is a continuation-in-part of Ser. No. 163,103, Mar. 2, 1988, abandoned.

[30] Foreign Application Priority Data

Apr. 21, 1987 [JP] Japan ................................ 62-97965

[51] Int. Cl.$^5$ ............................................. F16B 11/00
[52] U.S. Cl. .................................... 403/282; 403/345; 403/30; 29/525
[58] Field of Search ............... 403/282, 345, 273, 359, 403/30, 404, 28, 334, 383; 29/525

[56] References Cited

U.S. PATENT DOCUMENTS

| | | | |
|---|---|---|---|
| 4,118,134 | 10/1978 | Mansel | 403/282 |
| 4,330,914 | 5/1982 | Hood | 403/282 X |
| 4,509,381 | 4/1985 | Ikemoto et al. | 403/282 X |
| 4,631,973 | 12/1986 | Eley | 403/273 X |
| 4,747,763 | 5/1988 | Sibata et al. | 403/282 X |
| 4,886,392 | 12/1989 | Iio | 403/282 |

FOREIGN PATENT DOCUMENTS

| | | | |
|---|---|---|---|
| 135229 | 10/1980 | Japan | 403/30 |
| 63-266212 | 11/1988 | Japan . | |

Primary Examiner—Peter M. Cuomo
Attorney, Agent, or Firm—Wenderoth, Lind & Ponack

[57] ABSTRACT

A jointing structure of a rotor and a shaft has a rotor made of aluminum alloy having a through-hole at a center thereof, and a shaft made of steel which is to be press fitted into the through-hole of the rotor, the shaft being formed at least at a part of a surface to be jointed with the through-hole of the rotor with a hump and valley portion along an axis thereof, the outer diameter of the hump portion being larger than the inner diameter of the through-hole, the hump and valley portion of the shaft being press fitted into the through-hole of the rotor.

10 Claims, 6 Drawing Sheets

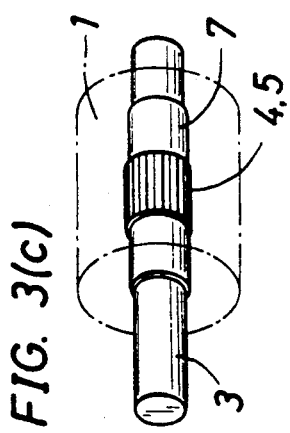
FIG. 3(a)
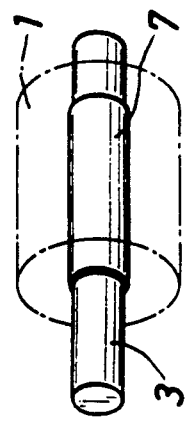
FIG. 3(b)
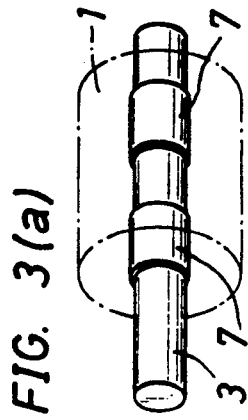
FIG. 3(c)
FIG. 4
| | COEFFICIENT OF THERMAL EXPANSION | WEAR RESISTANCE | STRENGTH | RIGIDITY |
|---|---|---|---|---|
| CASTING MATERIAL | △ | ○ | × | △ |
| EXPANDING MATERIAL | × | × | ○ | × |
| HIGH Si ALLOY EXTRUDING MATERIAL | △ | ○ | ○ | △ |
| POWDER EXTRUDING MATERIAL | ○ | ○ | ○ | ○ |
○:GOOD    △:FAIR    ×:POOR

FIG. 5

| ALLOY COMPOSITION (wt%) | TENSILE STRENGTH (Kg/mm²) | YOUNG'S MODULUS (Kg/mm²) | COEFFICIENT OF THERMAL EXPANSION (×10⁻⁶/°C) |
|---|---|---|---|
| (I) Al-12Si-5Fe | 42.6 | 9200 | 18.2 |
| (II) Al-20Si-5Fe-2Ni | 42.2 | 10100 | 16.4 |
| (III) Al-20Si-1Ni | 26.2 | 9000 | 17.5 |
| (IV) Al-2.5Mg-0.25Cr | 28.0 | 7200 | 23.8 |
| (V) Al-12Si-1Ni | 38.5 | 8000 | 20.0 |

FIG. 6

| No. | ROTOR | SHAFT | JOINTING METHOD |
|---|---|---|---|
| 1 | (I)~(V) | (a) PRESS-FIT WIDTH NONE | ELECTRONIC BEAM WELDING |
| 2 | (I)~(V) | (a) PRESS-FIT WIDTH NONE | Zn-Cd SOLDERING |
| 3 | (I) | (b) PRESS-FIT WIDTH 80 μm | SHRINKAGE-FIT AT 200°C |
| 4 | (I)~(V) | (b) PRESS-FIT WIDTH 100 " | " |
| 5 | (I) | (b) PRESS-FIT WIDTH 120 " | " |
| 6 | (II) | (b) PRESS-FIT WIDTH 100 " | LIQUID N₂ COLD-FIT |
| 7 | (I) | (c) PROJECTING PORTION 30 " | SHRINKAGE-FIT AT 200°C |
| 8 | (I)~(V) | (c) PROJECTING PORTION 50 " | " |
| 9 | (I),(II) | (c) PROJECTING PORTION 80 " | " |
| 10 | (I) | (c) PROJECTING PORTION 100 " | " |

FIG. 7

| No. | ROTOR | SLIDE TORQUE |
|---|---|---|
| 1 | (I) | 1.3 |
|  | (II) | 2.0 |
|  | (III) | 1.7 |
|  | (IV) | 2.1 |
|  | (V) | 1.9 |
| 2 | (I) | 2.8 |
|  | (II) | 3.1 |
|  | (III) | 2.7 |
|  | (IV) | 4.0 |
|  | (V) | 2.8 |
| 3 | (I) | 10.2 |
| 4 | (I) | 10.5 |
|  | (II) | 11.2 |
|  | (III) | 10.1 |
|  | (IV) | 9.5 |
|  | (V) | 10.9 |
| 5 | (I) | 10.8 |
| 6 | (II) | 15.2 |
| 7 | (I) | 20.0 |
| 8 | (I) | 35 |
|  | (II) | 36 |
|  | (III) | 34 |
|  | (IV) | 26 |
|  | (V) | 32 |
| 9 | (I) | 42 |
|  | (II) | 40 |
| 10 | (I) | 48 |

FIG. 8

| No. | ROTOR | SHAFT | JOINTING METHDE |
|---|---|---|---|
| 13 | (I) | (a) FIT-IN WIDTH 80 μm | SHRINKAGE-FIT AT 200°C |
| 14 | (I) | (a) FIT-IN WIDTH 100 " | " |
| 15 | (I) | (a) FIT-IN WIDTH 120 " | " |
| 16 | (II) | (a) FIT-IN WIDTH 100 " | " |
| 17 | (I) | (b) FIT-IN WIDTH 80 " | " |
| 18 | (I) | (b) FIT-IN WIDTH 100 " | " |
| 19 | (I) | (b) FIT-IN WIDTH 120 " | " |
| 20 | (II) | (b) FIT-IN WIDTH 100 " | " |
| 21 | (I) | (c) PROJECTING PORTION 50 μm | " |
| 22 | (I) | (c) PROJECTING PORTION 80 " | " |
| 23 | (II) | (c) PROJECTING PORTION 80 " | " |

FIG. 9

| No. | SLIDE TORQUE |
|---|---|
| 13 | 23 |
| 14 | 25 |
| 15 | 28 |
| 16 | 25 |
| 17 | 20 |
| 18 | 18 |
| 19 | 18 |
| 20 | 18 |
| 21 | 58 |
| 22 | 65 |
| 23 | 64 | ns
JOINTING STRUCTURE OF ROTOR AND SHAFT

CROSS REFERENCE TO RELATED APPLICATION

This application is a continuation of now abandoned application Ser. No. 07/373,204 filed on Jun. 30, 1989, now abandoned, which is a Continuation-in-part of Ser. No. 07/163,103, filed Mar. 2, 1988, now abandoned.

BACKGROUND OF THE INVENTION

The present invention relates to a jointing structure of a rotor and a shaft which is suitable for jointing, for example, a rotor for use in a cooling medium compressor, and more particularly to a jointing structure, in which a rotor and a shaft can be firmly jointed.

DESCRIPTION OF THE PRIOR ART

A conventional jointing structure comprises a rotor made of steel or iron based sintering material and formed with a through-hole at the center thereof and a steel shaft inserted into the through-hole. This type of conventional jointing structure is widely used, for example, in a rotor for a cooling medium compressor.

However, until a recent time, a jointing structure in which the rotor is made of aluminum alloy instead of iron based material has been considered to be more promising in view of the tendency in that a compressor has been made lighter in weight. In that case, if the rotor and shaft are jointed by shrinkage fit or the like as in the prior art, the strength thereof becomes problematical.

Therefore, as means for jointing a steel shaft into an aluminum alloy rotor, the following methods have been studied.

(1) A welding method, in which a shaft is inserted into a through-hole of a rotor and welded to the rotor by electron beam welding or the like.

(2) A soldering method, in which a shaft is inserted into a through-hole of a rotor and welded to the rotor using a soldering material.

(3) A shrinkage fit method, in which a shaft is inserted into a through-hole of a heated rotor with pressure.

(4) A cold fit method, in which a cooled shaft is inserted into a through-hole of a rotor with pressure.

However, any of the above-mentioned jointing methods has the following shortcomings.

(1) In the welding method, taking an electron beam welding for example, only a part of the rotor and shaft can be welded. The result is that a firm jointing is unobtainable, productivity becomes poor, and that crystal grains and precipitated particles contained in the aluminum alloy of the rotor become coarser, thereby degrading the material properties.

(2) In the soldering method, the productivity is poor, in addition, there is presented no soldering material which has an ability to joint aluminum alloy and steel with a sufficient strength, and the rotor and shaft are occasionally separated during operation owing to differences in each coefficient of thermal expansion.

(3) In the shrinkage fit method, given that the jointing surface of the aluminum alloy rotor is plastically deformed by heat, even if the press-fit width thereof is wide, a firm joint is difficult to obtain.

(4) In the cold fit method, a firm joint is difficult to obtain and, in addition, as the shaft is cooled by a cooling medium such as liquid nitrogen, installation costs thereof become high and productivity becomes poor.

The present invention has been accomplished in order to overcome the above-mentioned problems inherent in the prior art.

OBJECT AND SUMMARY OF THE INVENTION

It is therefore an object of the present invention to provide a jointing structure of a rotor and a shaft in which a rotor made of aluminium alloy and a shaft made of steel can be firmly jointed.

Another object of the present invention is to provide a jointing structure of a rotor and a shaft which has a suitable quality and structure in order to meet with the above-mentioned object.

A further object of the present invention is to provide a jointing structure of a rotor and a shaft which is simple in structure and easy to manufacture.

A still further object of the present invention is to provide a jointing structure of a rotor and a shaft which is suitable to a rotor for use in a cooling medium compressor.

In order to achieve the above-mentioned objects, a jointing structure of a rotor and a shaft according to the present invention comprises a rotor made of aluminum alloy having a through-hole at the center thereof, and a shaft made of steel that is to be press fitted into the through-hole of the rotor, the shaft being formed at least at a part of a surface to be jointed with the through-hole of the rotor with an uneven portion or a hump and valley portion along an axis thereof. The hump portion has a larger outer diameter than the inner diameter of the through-hole.

The above-mentioned objects and further features and advantages of the present invention will become more apparent to those skilled in the art from the following detailed description with reference to the accompanying drawings, wherein:

BRIEF DESCRIPTION OF THE DRAWINGS

FIGS. 2(a), 2(b) and 2(c) are perspective views showing how to joint the rotor with the shaft, wherein FIG. 2(a) shows one example in which the shaft is provided with no press-fit width, FIG. 2(b) shows another example in which the shaft is provided at a jointing surface thereof with a press-fit width, and FIG. 2(c) shows a still another example in which the shaft is provided at a jointing surface thereof with an uneven portion or hump and valley portion;

FIGS. 3(a), 3(b) and 3(c) are perspective views showing modified embodiments of the jointing structure of a rotor and a shaft, wherein FIG. 3(a) shows one example in which the shaft is provided at both marginal portions of a jointing surface thereof with a press-fit width, respectively, FIG. 3(b) shows another example in which the shaft is provided at an entire surface thereof with a press-fit width, and FIG. 3(c) shows a still another example in which the shaft is likewise provided at an entire surface thereof with a press-fit width, and the press-fit width is provided with an uneven portion or hump and valley portion formed at a central portion thereof;

FIG. 4 is an illustration showing the correlation of various characteristics required for aluminum alloy and the rotor;

FIG. 5 is an illustration showing the composition of a rotor material used in the test of the present invention and the mechanical and physical characteristics;

FIG. 6 is an illustration showing a first testing method;

FIG. 7 is an illustration showing the result of the first test example;

FIG. 8 is a relation diagram showing a second testing method; and

FIG. 9 is a relation diagram showing the result of the second test example.

FIG. 10($b$) is a section view of an embodiment in which the inside diameter of the through hole is divided into three steps and these three stepped diameters are decreased sequentially in the shaft press-fitting direction.

DETAILED DESCRIPTION OF THE PREFERRED EMBODIMENT

Figure 1:
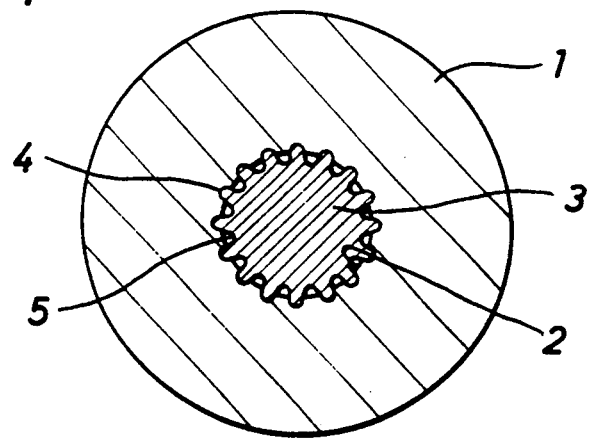
FIG. 1 is a sectional view showing a jointing structure of a rotor and a shaft according to one preferred embodiment of the present invention.

One preferred embodiment of the present invention will be described hereunder with reference to the accompanying drawings. A jointing structure of the present invention comprises a rotor 1 made of aluminum alloy having a through-hole 2 at the center thereof, and a shaft 3 made of steel having a series of humps 4 and valleys 5 on at least a part of a jointing surface for jointing with the rotor 1 at the through-hole 2 thereof, the outer diameter of the hump portion 4 being larger than the inner diameter of the through-hole 2. The shaft 3 with the hump portion 4 and valley portion 5 is press fitted into the through-hole 2 of the rotor 1. The outer diameter of the hump portion 4 of the shaft 3, as shown in FIG. 1, is formed larger than the original inner diameter of the through-hole 2 of the rotor 1 before press fitted, and the outer diameter of the valley portion 5 is formed smaller than the inner diameter of the inner diameter of the through-hole 2. Therefore, by press fitting the hump portion 4 and valley portion 5 into the through-hole 2 of the rotor 1, the inner peripheral surface of the through-hole 2 is deformed in a depressed shape along the series of humps 4 and valleys 5 of the shaft 3. By intimately meshing thereof, a firm jointing is obtainable.

Particularly, if they are fitted together by shrinkage fit method in which the rotor 1 heated to several hundred degrees celsius and fitted, and as the inner peripheral surface of the through-hole 2 is softened, the rotor 1 is readily deformed along the series of humps 4 and valleys 5 of the shaft 3.

In this case, in order to obtain a firm jointing between the rotor 1 and the shaft 3, it is preferable that the height difference between the valley portion 5 of the shaft 3 and the hump portion 4 thereof is 50 through 300 $\mu$m and the diameter of the outer periphery of the hump portion 4 is larger than the diameter of the through-hole 2 by 50 through 100 $\mu$m (corresponding to the press-fit width). In this case, it is preferable that the outside diameter of the above-mentioned hump portion 4 is greater than by 0.31%–0.50% than the diameter (or the inside diameter) of the through-hole 2 and also that the diameter of the through-hole 2 is 15–20 mm. The above-mentioned ratio of the outside diameter of the hump portion 4 to the diameter of the through-hole 2 is determined by the following reasons. That is, assuming that the rotor 1 is formed of an aluminum alloy selected out of Al-Si alloys containing a higher percentage of silicon (Si), such as 35% silicon, the coefficient of thermal expansion of the rotor 1 is $14 \times 10^{-6}/°C$. $19 \times 10^{-5}/°C$. in the range of temperature of 20° C.-(R)° C.

And, when the rotor 1 and the shaft 3 are press fitted, provided the temperature of the rotor 1 is 200° C.±20° C. and the temperature of the shaft 3 is 10° C.-30° C., then the maximum temperature difference therebetween is 210° C. and the minimum temperature difference 150° C.

Therefore, if the products of the maximum and minimum temperature difference value, respectively, multiplied by the greatest and smallest values of the above-mentioned coefficients of thermal expansion, that is, the values of expansion of the material are added to the ratios of the working tolerances of the material, then we can obtain the above-mentioned ratio, that is, 0.31%–0.50%.

For example, assuming that the inside diameter of the through-hole 2 is 18 mm and the dimensional tolerance thereof is ±9 $\mu$m, then the resultant ratio thereof is $18 \times 10^{-3}/18$, that is, 0.1%.

Therefore, if the inside diameter of the through-hole 2 is 15–20 mm, then the product thereof is 47–100 $\mu$m, which substantially corresponds to the above-mentioned 50–100 $\mu$m.

In this manner, by regulating the dimensions of the hump portion 4, there can be obtained a reasonable fitting strength which is suitable for the materials and mechanical properties of the rotor 1 and the shaft 3 as well as for the press-fitting methods thereof. If the height difference between the valley portion 5 and the hump portion 4 and the difference in diameter between the outer periphery of the hump portion 4 and the through-hole 2 are smaller than the above-mentioned ranges, the provision of the hump portion 4 and valley portion 5 on the shaft renders no substantial effect and there is no substantial difference compared with the conventional press-fit. On the other hand, if those differences are larger than the above-mentioned ranges, the inner surface of the rotor 1 is likely torn and no effect is produced as a press-fit.

Further, the aluminum alloy constituting the rotor 1 is preferably $21 \times 10^{-6}/°C$. or less in coefficient of thermal expansion, and most preferably $19 \times 10^{-6}/°C$. or less. The reason is that, if the coefficient of the thermal expansion exceeds the above-mentioned values, the difference in the coefficient of thermal expansion of the shaft 3 becomes large and a loosening is likely to occur at the jointing surface when a heat cycle is applied thereto.

Further, as an aluminum alloy used as the rotor 1, in addition to the afore-mentioned requirement of a low coefficient of thermal expansion, the aluminum alloy is required to have a good wear resistance, and a sufficient strength and rigidity so as not to be deformed during operation.

Therefore, let us review the various conditions required for such a rotor with respect to various kinds of aluminum alloys.

If the aluminum alloys are classified according to how they are manufactured, they can be classified in three groups such as a casting material, an extruded material, and an extruded powder material. The aluminum alloy extruded material such as 2000, 5000, and 7000 series containing no Si is high in strength but large in coefficient of thermal expansion and lacks in wear resistance.

Therefore, from a view point of coefficient of thermal expansion and wear resistance, an Al-Si alloy containing Si is preferable. However, if the Si content is large, a strong alloy is difficult to obtain using an ordinary casting material owing segregation of Si and therefore, the Si content should be about 20% at most.

The casting Al-Si alloy extruded material, when the Si content is large, is required to be subjected to a complicated treatment so that Si grains are uniformed to be 30 μm or less in view of strength, etc. Even in that case, the Si content is 20% at most.

On the other hand, in the case of the extruded powder material which was recently developed, since alloy powders which were rapidly cooled and solidified, are used, a large amount of alloy element can be added. Therefore, there can be obtained an aluminum alloy having a uniform microstructure without segregation in which the crystal grains and precipitates particles are fine in size.

In the case of Al-Si alloy, for example, the Si content is allowable up to 35%. Particularly, Al-Si alloy having the crystal grain and precipitated particle of 30 μm or less in size is high in strength and low in coefficient of thermal expansion and excellent in wear resistance. Therefore, this is the most suitable aluminum alloy as a rotor material.

If the relation between the various aluminum alloys and the various characteristics required for the rotor is qualitatively shown, it becomes something as shown in FIG. 4.

Concrete examples of aluminum alloys as a rotor material are Al-Si-Fe based alloy, Al-Si-Fe-Ni based alloy, Al-Si based alloy, Al-Fe based alloy, etc. of extruded powder material. Examples of a shaft material are low alloy steels such carbon steel, chrome steel or the like.

Therefore, in order to confirm the characteristics of the rotor materials, the present inventor has carried out the following first and second tests and totally judged the acceptability of the rotor materials based on the test results.

First, in the first test, five testing rotors 1 formed of different aluminum alloys were prepared as shown in FIG. 5. The details of the rotor materials 1 were AL alloy (I),(II) made by two kinds of powder extrusion, AC9B casting Al alloy (III) stipulated by JIS (Japan Industrial Standard) H5202, A5052 extruded Al alloy stipulated by JIS H 4040, and A4032 forged Al alloy stipulated by JIS H4140.

And, these various materials were machined to obtain five testing rotors 1 having the identical shape and having the outer diameter of 70 mm, the width of 16 mm, and the inner diameter of the through-hole 2 of 18 mm 0.042. The shaft 3 was finished so as to have the outer diameter of 18 mm$\pm 0.004$ using a quenched chrome steel (Hv=730), and the resultant was machined and obtained the kinds of shafts as shown in FIGS. 2(a), 2(b) and 2(c).

Figure 2A:
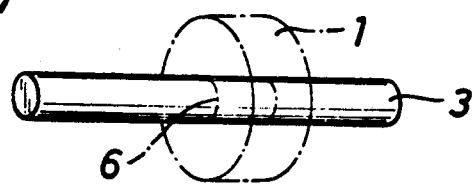
Figure 2B:
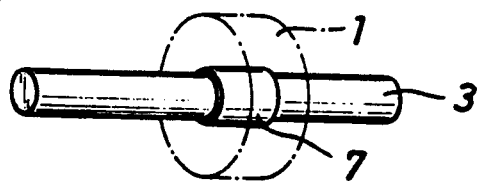
Figure 2C:
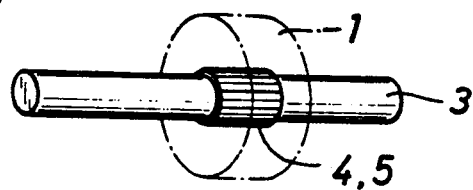

That is, the shaft 3 of FIG. 2(a) is formed in a straight rod without having a press-fit width, the shaft 3 of FIG. 2(b) is provided on the entire jointing surface for jointing with the rotor 1 with a linear shaft shaped press-fit width 7, and the shaft 3 of FIG. 2(c) is formed on the afore-mentioned entire jointing surface with hump portion 4 and valley portion 5 along the axial direction thereof.

And, these rotors 1 and shafts 3 were jointed in the combinations and methods as shown in FIG. 6 to prepare the testing rotors 1. Of them, the rotors according to the present invention were test sample Nos. 7 through 10. In preparation of these samples, the welding and soldering were made only onto the peripheral portion 6 of the jointing surface, but all other procedures were the same as the conventional one. That is, the rotor 1 and the shaft 3 were press fitted together either by the shrinkage fit method in which the rotor 1 was heated and fitted, or by the cold fit method in which the shaft 3 was cooled and fitted.

In FIG. 6, the value of the hump portion 4 is a value obtained by deducting the diameter of the through-hole 2 from the diameter of the outer periphery of the hump portion 4 and corresponds to the press-fit width.

Such prepared testing rotors 1 were measured the slide torque (kg.m) which was produced when the shaft 3 was rotated while maintaining the rotor 1 in its stationary posture. The results are shown in FIG. 7. As apparent from the figure, the testing sample Nos. 7 through 10 according to the present invention were found out to have a remarkably high jointing strength compared with the conventional products. Above all, the jointing structure obtained by press fitting the shaft 3 with the hump portion 4 formed thereon into the rotor 1 made of Al alloy formed by a powder extrusion, was confirmed to have a significantly large strength.

Next, in the second test example, only Al alloys of (I) and (II) were used for preparing the testing rotor 1 having the outer diameter of 70 mm, and the inner diameter of the through-hole of 18 mm (these are the same in dimension as the first test example), but only the width thereof was changed from 16 mm to 45 mm. As for the shaft 3, the same material as that of the first test was used and machined to obtain three kinds of test samples as shown in FIGS. 3(a), 3(b) and 3(c).

That is, the shaft 3 of FIG. 3(a) is provided at both ends of the jointing surface for jointing with the rotor 1 with a linear shaft shaped press-fit width 7, respectively, the shaft 3 of FIG. 3(b) is provided on the entire jointing surface with the linear shaft shaped press-fit width 7, and the shaft 3 of FIG. 3(c) is provided on the entire jointing surface with the linear shaft shaped press-fit width 7 and the press-fit width 7 is formed at the center thereof with a hump portion 4 and a valley portion 5 along the axial direction thereof.

And, these rotor 1 and the shaft 3 were fitted together in a combination as shown in FIG. 8 and testing rotors 1 were prepared. Of them, the rotors 1 according to the present invention are test sample Nos. 21 through 23. In preparation, a shrinkage method was employed, in which all rotors 1 were heated at 200° C. and press fitted.

In FIG. 8, the value of the hump portion 4 is a value obtained by deducting the diameter of the through-hole 2 from the diameter of the outer periphery of the hump portion 4 and corresponds to the press-fit width.

Such prepared testing rotors 1 were measured the slide torque (kg.m) which was produced when the shaft 3 was rotated while maintaining the rotor 1 in its stationary posture. The results are shown in FIG. 9. As apparent from the figure, the testing sample Nos. 21 through 23 according to the present invention were found out to have a remarkably high jointing strength compared with the conventional products. Especially, it was confirmed that the larger the dimension of the hump portion 4 is, the more significant the strength is.

Further, the present inventors have confirmed that a similar result to the above-mentioned one can be obtained as well by reducing gradually or stepwise the inside diameter of the through-hole 2, which meshes with the hump and valley portions 4 and 5 in the press-fitting direction of the shaft 3 in FIGS. 2 (C) and 3 (C).

Figure 10A:
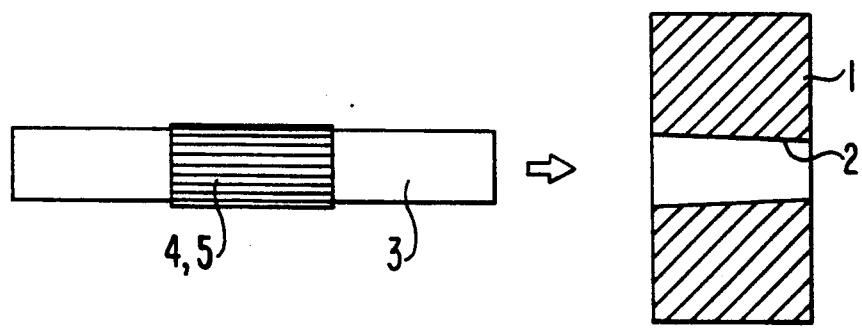
FIG. 10($a$) is a section view of an embodiment in which the inside diameter of the through hole is gradually decreased along the shaft press-fitting direction.
Figure 10B:
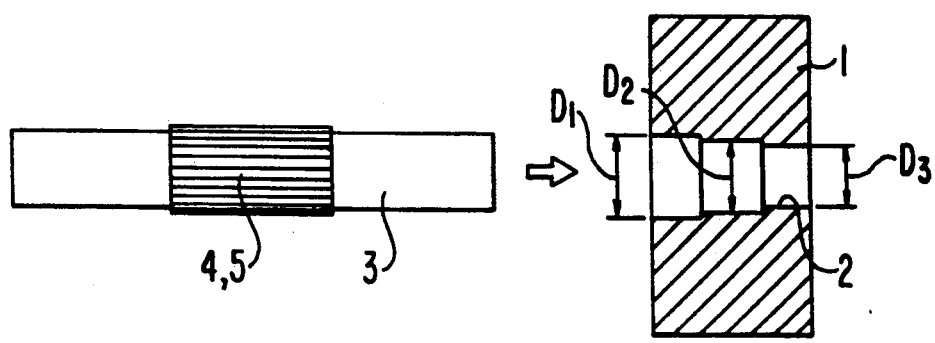

FIG. 10(a) shows an embodiment in which the inside diameter of the through-hole 2 is gradually reduced along the press-fitting direction of the shaft 3, and FIG. 10(b) shows an embodiment in which the inside diameter of the through-hole 2 is divided into three-stages which decrease sequentially in the press-fitting directions of the shaft 3.

In FIG. 10(b), the inside diameters $D_1 > D_2 > D_3$ of the through-hole 2 are sequentially decreased by 0.31%–0.50% and the reason for this decreasing ratio is the same as in the above-mentioned case.

As described in the foregoing, according to the present invention, a rotor made of aluminum alloy with a through-hole formed at the center thereof is heated to 200° C. and a shaft made of steel formed with a valley and hump portion along the axial direction thereof, the difference of the height between the hump portion and the valley portion being 50 through 300 μm, the diameter of the outer periphery of the hump portion being formed larger by 50 through 100 μm than the diameter of the outer diameter of the through-hole, is press fitted into the through-hole. By means of this, the rotor and shaft can be firmly fitted.

Further, as the rotor is made of aluminum alloy produced by a powder metallurgy method having a coefficient of thermal expansion of $21 \times 10^{-6}/°C$. or less, or Al-Si based aluminum alloy having a crystal grain and a precipitated particle of 30 μm or less, the jointing strength can be increased and the wear resistance can be increased. Thus, there can be obtained a rotor suitable for use in a cooling medium compressor.

Another embodiment of Applicants' invention has additional features such as, for example, the dimensional ratio between the hump portion and the through hole and the dimension of the through hole, the temperature and differences in temperature of and between the rotor 1 and the shaft 3 when shrinkage fitting, and the like.

The present invention is characterized by the embodiment of Applicants' invention that physically incorporates the invention and solves the problem inherent in the rotor 1 being made of a high silicon aluminum alloy, i.e., the cutting brittleness is extremely low due to hardness, and press fit fins are readily developed or produced upon press fitting.

Therefore, the present invention is basically different from U.S. Pat. No. 4,747,763 (to Sibata et al.), which employs a rotor assembly 16 made of a soft aluminum alloy, and the rotor assembly 16 and a shaft 14 are provided with humps and valleys, thereby the rotor assembly 16 and the shaft 14 are simply press fitted. The invention is also basically different from U.S. Pat. No. 4,631,973 (to Eley) which teaches a simple shrinkage fitting.

(1) First, the advantages of the rotor 1 which is made of a high silicon aluminum alloy and physical and mechanical features of the metallic structure are as follows;

(a) A coefficient of thermal expansion is small, the strength and rigidity are high, and wear resistance is excellent.

(b) As the aluminum alloy is made by a powder-metallurgy processing in which a large quantity of alloy elements can be added, crystal grains and precipitates can be miniaturized, and a non-segregated, uniform structure can be obtained without being subjected to any miniaturizing treatment, which is usually employed in the case of a high silicon aluminum alloy.

Moreover, as the claimed sizes of the silicon crystal grains and the precipitates are 30 μm or less, the structure is miniaturized and the strength is increased.

(c) Next, as a coefficient of thermal expansion of the alloy is $19 \times 10^{-6}/°C$. or less, the difference in coefficient of thermal expansion between the rotor 1 and the shaft 3 can be restrained. Therefore, there can be effectively prevented the occurrence of loosening at the jointing surfaces when a heat cycle is experienced by the joined shaft and rotor.

(2) The following is a summary of the constitution which is employed by the present application in order to solve the problem inherent in the rotor 1 which is made of a high silicon aluminum alloy.

That is, as a high silicon aluminum alloy is hard, a cutting brittleness thereof is significantly low. Therefore, fins are easily produced when press fitting. In case that the present invention is applied to a rotor for use in a compressor of an air conditioning apparatus for example, such fins are probably readily knocked off during rotation of the rotor. In that case, there is the risk that the rotor will become unable to rotate.

Therefore, it is desirable that a pressure applied to the shaft 3 is minimized as means for preventing the generation of the press fitting fins when the rotor 1 and the shaft 3 are press fitted. To this end, first, the press fit width, i.e., the dimensions of the hump portion 4 and the through hole 2, etc. are strictly limited as mechanical means and second, a shrinkage fitting is employed as machining means under the condition that the press fitting pressure is lowered.

In view of the foregoing, the present invention does not employ the method that the shaft and rotor are formed with humps and valleys and the shaft and rotor are merely press fitted, as seen in the ordinary aluminum alloy rotors.

Therefore, the shrinkage fitting method employed in the present invention is not employed as one method for merely press fitting. It is employed because the rotor is made of a high silicon aluminum alloy. Owing to the rotor being made of a high silicon aluminum alloy along with the rigid dimensional limitations as to the hump portion, through hole, the hump and valley portions, etc., an occurrence of the press fitting fins can be prevented.

(A) Next, there will be described concrete dimensions of the hump portion, the through hole, and the hump and valley portions, and the like the reasons why such dimensions are required, and the importance of such limitation.

As already discussed, in the present invention, the outer diameter of the hump portion 4 is larger than the diameter of the through hole 2 by 0.31% to 0.50% and the diameter of the through hole 2 is 15 to 20 mm, thereby to make the outer diameter of the hump portion 4 larger than the diameter of the through hole 2 by 50 to 100 μm.

The ground of this embodiment physically incorporating Applicants' invention is as follows.

That is, given that the rotor 1 is made of a high silicon Al-Si based aluminum alloy containing 35% of silicon (Si), a coefficient of thermal expansion is 20° C. to 200° C. and $19 \times 10^{-6}/°C$. And, when the rotor 1 and the shaft 3 are press fitted (shrinkage fitted), presuming that the temperature of the rotor 1 is 200° C. to 30° C.±20°

C. and that of the shaft 3 is 10° to 30° C., the difference in temperatures is 210° maximum and 150° C. minimum.

Therefore, the afore-mentioned 0.31% to 0.50% can be obtained by adding a rate of a machining tolerance with a product of the maximum value and minimum value of the difference in temperatures and the maximum value and the minimum value in the range of the coefficient of thermal expansion, i.e. displacement.

For example, given that the inner diameter of the through hole is 18 mm and a dimensional tolerance thereof is ±9 μm, the rate becomes $18 \times 10^{-3}/18$ and thus 0.10%.

Therefore, given that the inner diameter of the through hole 2 is 15 to 20 mm, a product thereof becomes 47 to 100 μm which is analogous to the afore-mentioned 50 to 100 μm.

(B) The reason why the present application strictly limits the dimensions of the hump portion 4 and the through hole 2 is, as repeatedly discussed, that an occurrence of press fitting fins (a tear-off occurring on the inner peripheral surface of the through hole 2 when press fitting) is highly undesirable.

Particularly, as the rotor in the present application is a high silicon aluminum alloy which is very low in cutting brittleness, the production of press fitting fins or tear-off is very much a concern. Therefore, there is required a particular construction or constitution which is not seen in the rotor of an ordinary aluminum alloy.

While there has been described what is at present considered a preferred embodiment of the present invention, it will be obvious to those skilled in the art that changes and modifications may be made without departing from the present invention, and it is, therefore, aimed in the appended claims to cover all such changes and modifications as followed in the true spirit and scope of the present invention.

We claim:

1. A rotor shaft jointing structure, comprising:
   a rotor made of an aluminum alloy and having therein a through hole, said through hole having a plurality of axially extending stepped portions of inside diameters decreasing stepwise in a press-fitting direction, varying from one another, and a dimensional tolerance, and said rotor further having a predetermined coefficient of thermal expansion; and
   a shaft made of steel having a peripheral surface with a single hump and valley portion extending along said shaft and comprising a plurality of humps and valleys extending in the axial direction of said shaft, said humps having a constant outside diameter and said shaft having been press-fitted in said through hole of said rotor at a predetermined temperature difference with said rotor such that said humps of said single hump and valley portion are in contact with each of said plurality of stepped portions of said shaft;
   wherein said outside diameter of said humps is larger than an amount equal to the sum of: any one of the inside diameters of said through hole, said dimensional tolerance thereof, and the product of said coefficient of thermal expansion of said rotor multiplied by said predetermined temperature difference.

2. A rotor shaft jointing structure as set forth in claim 1, wherein said outside diameter is larger than anyone of the inside diameters by 0.31%–0.50%.

3. A rotor shaft jointing structure as set forth in claim 1, wherein said rotor is made of a powder extruded high silicon Al-Si aluminum alloy containing 35% or less silicon.

4. A rotor shaft jointing structure as set forth in claim 1, wherein said rotor is made of an Al-Si aluminum alloy in which crystal particles or deposit particles of silicon are 30 μm or less in size.

5. A rotor and shaft jointing structure as set forth in claim 1, wherein said rotor is made of an aluminum alloy having a coefficient of thermal expansion of $21 \times 10^{-6}$ or less.

6. A rotor and shaft jointing structure as set forth in claim 1, wherein the height difference between said humps and said valleys of said hump and valley portion is 50–150 μm.

7. A rotor and shaft jointing structure as set forth in claim 1, wherein the diameter of said through hole is 15–20 mm and the outside diameter of said humps is larger by 50–100 μm than the diameter of said through hole.

8. A rotor and shaft jointing structure as set forth in claim 1, wherein said rotor is heated up to temperatures of 180° C.–220° C. when said rotor and said shaft are press fitted.

9. A rotor shaft jointing structure as set forth in claim 1, wherein said shaft is maintained at temperatures of 10° C.–30° C. when said rotor and said shaft are press fitted together.

10. A rotor and shaft jointing structure as set forth in claim 1, wherein said predetermined temperature difference is 150° C.–210°.

* * * * *

UNITED STATES PATENT AND TRADEMARK OFFICE
CERTIFICATE OF CORRECTION

PATENT NO. : 5,158,390

DATED : October 27, 1992

INVENTOR(S) : Masahiro IIO et al.

It is certified that error appears in the above-identified patent and that said Letters Patent is hereby corrected as shown below:

On the title page,
Section [75], change "Masahiro Ito" to --Masahiro Iio--;

Claim 1, Column 10, line 7, change "shaft" to --rotor--.

Signed and Sealed this

Second Day of November, 1993

Attest:

BRUCE LEHMAN

Attesting Officer     Commissioner of Patents and Trademarks